United States Patent
Gates et al.

(10) Patent No.: US 8,116,697 B2
(45) Date of Patent: Feb. 14, 2012

(54) SYSTEM AND METHOD FOR REDUCING MULTI-MODULATION RADIO TRANSMIT RANGE

(75) Inventors: Dirk Gates, Westlake Village, CA (US); Kirk Matthews, Hidden Hills, CA (US); Kurt Sauter, Thousand Oaks, CA (US)

(73) Assignee: Xirrus, Inc., Thousand Oaks, CA (US)

( * ) Notice: Subject to any disclaimer, the term of this patent is extended or adjusted under 35 U.S.C. 154(b) by 889 days.

(21) Appl. No.: 11/939,541

(22) Filed: Nov. 13, 2007

(65) Prior Publication Data

US 2008/0113634 A1    May 15, 2008

Related U.S. Application Data

(60) Provisional application No. 60/858,142, filed on Nov. 10, 2006.

(51) Int. Cl.
*H04B 1/02* (2006.01)
(52) U.S. Cl. .................... 455/102; 455/127.1
(58) Field of Classification Search ............ 455/91, 455/102, 103, 115.1, 126, 127.1; 375/295, 375/296
See application file for complete search history.

(56) References Cited

U.S. PATENT DOCUMENTS

2004/0240424 A1* 12/2004 Fong et al. ............. 370/349
2005/0025254 A1*  2/2005 Awad et al. ............ 375/295
\* cited by examiner

*Primary Examiner* — Thanh Le
(74) *Attorney, Agent, or Firm* — The Eclipse Group LLP

(57) ABSTRACT

Systems and methods are provided for reducing multi-modulation radio transmit range. The method comprises determining a data modulation type at which a transmitter is operating, and adjusting a transmitter power according to the data modulation type to control transmit range. Each data modulation type may be determined to operate at a designated transmit power level by determining each data modulation type and arranging in order of a data connection rate corresponding to each data modulation type. For each data modulation type, the difference between a minimum signal-to-noise ratio (SNR) at the connection rate and a minimum SNR at the next higher connection rate is calculated. Starting with the lowest data connection rate and at the maximum transmit power, the transmitter power levels are calculated for each data connection rate such that the transmitter range is limited and operation at the highest data connection rate is permitted.

8 Claims, 5 Drawing Sheets

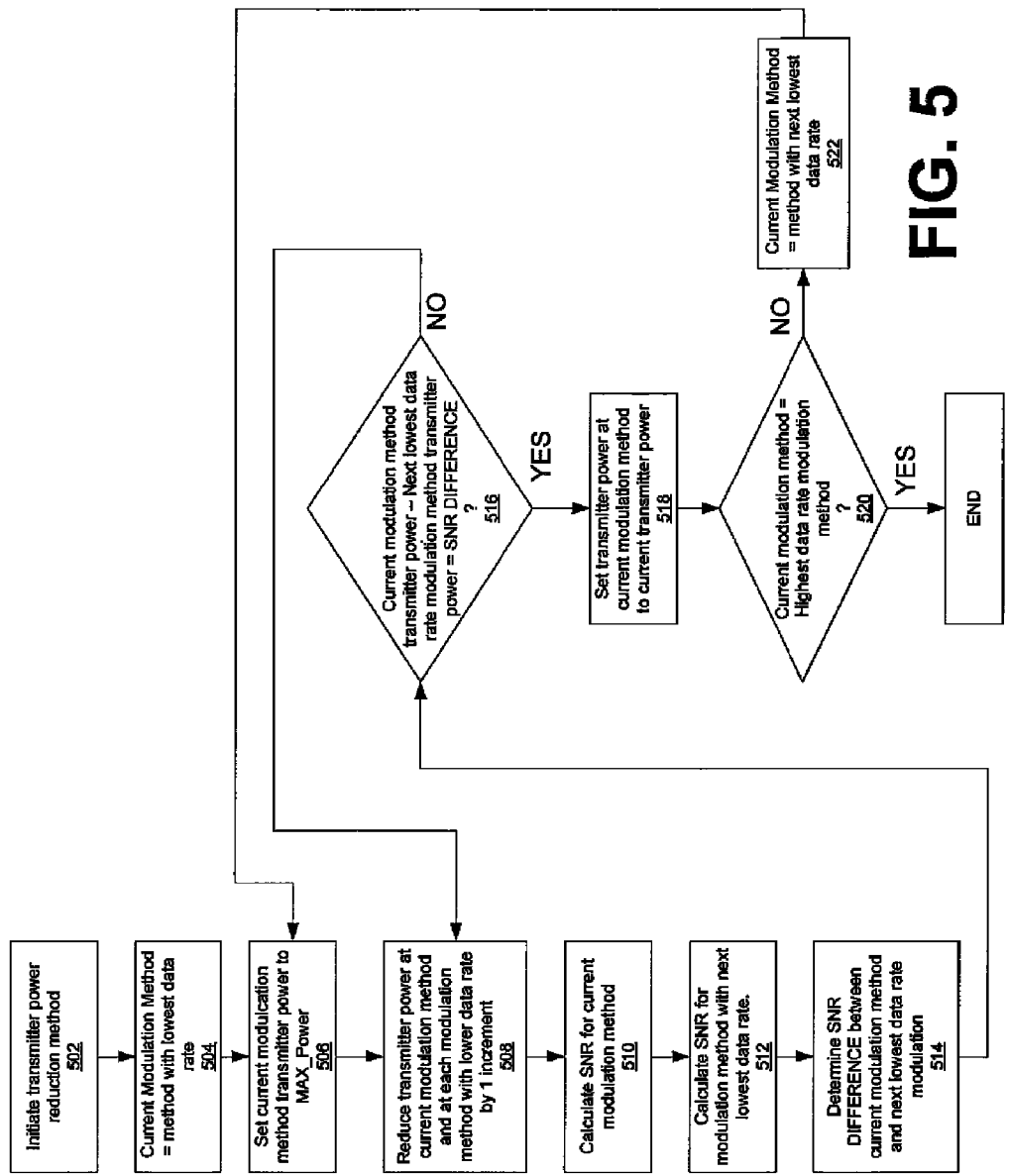

SYSTEM AND METHOD FOR REDUCING MULTI-MODULATION RADIO TRANSMIT RANGE

CROSS-REFERENCE TO RELATED APPLICATIONS

This application claims priority of U.S. Provisional Patent Application Ser. No. 60/858,142 filed on Nov. 10, 2006, titled "SYSTEM AND METHOD FOR REDUCING MULTI-MODULATION RADIO TRANSMIT RANGE," which is incorporated by reference in this application in its entirety.

BACKGROUND OF THE INVENTION

Wireless network communication systems that are based on the IEEE 802.11 (generally known as "WiFi") standard operate using a variety of complex modulation methods. Communicating nodes, such as network clients and access points, utilize trial and error methods to choose a transmit modulation method that is deemed by each of the nodes to be most appropriate for the short term signal to noise environment. Modulation methods are typically changed several times a second based on error rates and receive signal strength measurements.

Table 1 shows the typical signal to noise ratio (SNR) required by each of the modulation methods employed in an 802.11a communications systems.

TABLE 1

| Modulation (Method) | Data Rate (Mbps) | Required SNR (dB) |
| --- | --- | --- |
| BPSK ½ | 6 | 8 |
| BPSK ¾ | 9 | 9 |
| QPSK ½ | 12 | 11 |
| QPSK ¾ | 18 | 13 |
| 16-QAM ½ | 24 | 16 |
| 16-QAM ¾ | 36 | 20 |
| 64-QAM ⅔ | 48 | 24 |
| 64-QAM ¾ | 54 | 25 |

In order to simplify the discussions Modulation Methods are often described by their associated Data Rate. For example, 64-QAM ¾ modulation is described as 54 Mbps modulation.

The noise component of the SNR is generally determined by the receiver noise figure. Most present day receivers operating at normal ambient temperatures have similar noise figures. The signal level component of the SNR is generally determined by transmit power, antenna gain, and path loss. The path loss component is commonly simplified to represent the range or distance between the two communicating network nodes. Of all the above mentioned factors that relate to SNR, generally the factors that are commonly thought of as representing communications quality are data rate, range, and Packet Error Rate (PER).

Many wireless networking environments such as, for example, auditoriums, lecture halls, hospitals and large offices often require a dense deployment of access points in order to provide adequate bandwidth to all wireless users. In these examples, range is a detrimental factor. Transmitting with too much power (range) may cause unintended same channel interference (co-channel interference and overlapping cells) as well as adjacent channel interference (interference on an adjacent channel) for nearby access points (increasing Packet Error Rates). Transmitting with too much power Lange) may also cause other 802.11 radios that belong to other cells to defer transmission per the CSMA/CA specification in the IEEE standard. These factors limit channel re-use, performance and access point density. In some environments it is desired to limit connection range in order to enhance security. Transmit power can be controlled to more precisely define the boundary of a coverage pattern to lower the possibility that clients outside a physical boundary, such as a wall, can connect to a particular access point. Additionally, there are situations where it is desired that the interference on the same channel be minimized between access points of neighboring users in houses, and other multi-tenant units where the density and the proximity of users force a higher degree of channel reuse.

There is a need for a system and method for controlling multi-modulation transmit range.

SUMMARY

In view of the above, a method is provided for controlling multi-modulation radio transmit range. The method comprises determining a data modulation type at which a transmitter is operating, and adjusting a transmitter power according to the data modulation type to limit transmit range. Each data modulation type may be determined to operate at a designated transmit power level by determining each data modulation type and arranging in order of a data connection rate corresponding to each data modulation type. For each data modulation type, the difference between a minimum signal-to-noise ratio (SNR) at the connection rate and a minimum SNR at the next higher connection rate is calculated. Starting with the lowest data connection rate and at the maximum transmit power, the transmitter power levels are calculated for each data connection rate such that the transmitter range is limited and operation at the highest data connection rate is permitted.

In another aspect, a communication system is provided to communicate using multiple data modulation types. An example communication system includes a signal modulator to receive a data signal for transmission and to modulate the data signal for transmission according to one of the multiple data modulation types. A signal transmitter receives a modulated data signal from the signal modulator to transmit the signal over a communications medium at a transmitter power level. A transmitter controller determines a data modulation type and adjusts the transmitter power level to limit transmitter range.

Various advantages, aspects and novel features of the present invention, as well as details of an illustrated embodiment thereof, will be more fully understood from the following description and drawings.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 5 is a flowchart illustrating operation of an example method for controlling transmit range in a multi-modulation communication system.

DETAILED DESCRIPTION

In the following description of the preferred and various alternative embodiments, reference is made to the accompanying drawings that form a part hereof, and in which is shown by way of illustration a specific embodiment in which the invention may be practiced. It is to be understood that other embodiments may be utilized and structural changes may be made without departing from the spirit and scope of this invention.

As mentioned above, in many wireless networking environments lack of range control is a detrimental factor because it limits channel re-use and access point density. One example approach for reducing multi-modulation transmit range is to vary the 802.11 receive sensitivity between −90 dBm and −60 dBm.

Figure 1:
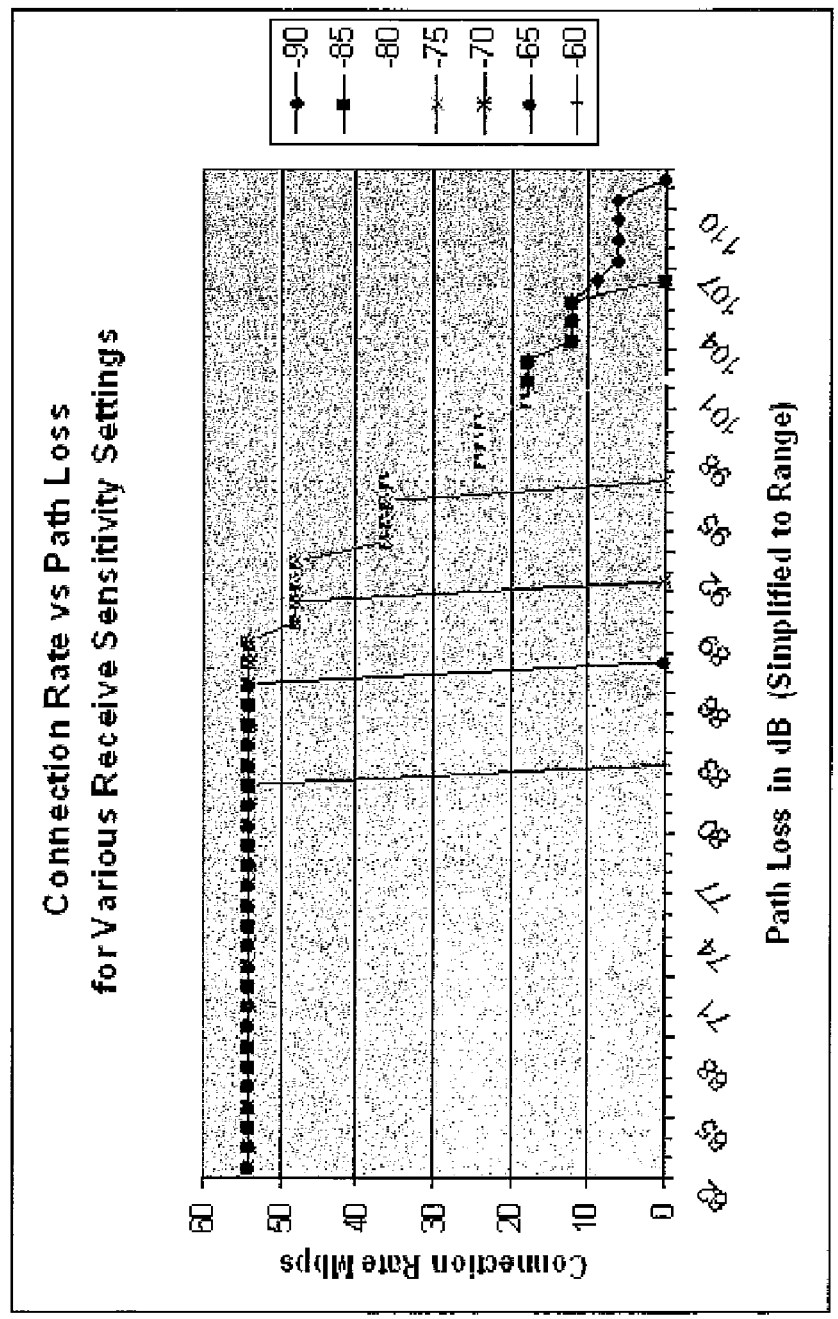
FIG. 1 shows a plot of connection rate versus path loss for various receive sensitivity settings.

FIG. 1 shows a plot of connection rate versus path loss for various receive sensitivity settings. The plot in FIG. 1 shows the typical effect upon data rate and range of varying the receive sensitivity of an example access point from example values of −90 dBm to −65 dBm in 5 dB steps. In general, the example values are derived from the SNR requirements of the various modulation types of Table 1 and are for illustrative purpose only without being a limitation to the scope of the invention.

FIG. 1 illustrates that reducing the receive threshold preserves the higher data rates and reduces the use of lower less efficient data rates. It is appreciated that all data rates may continue to be supported and in fact may be utilized for various channel co-ordination functions. As an example of a typical 802.11 access point, the transmit power may be varied between a maximum of 20 dBm and a minimum of −10 dBm.

Figure 2:
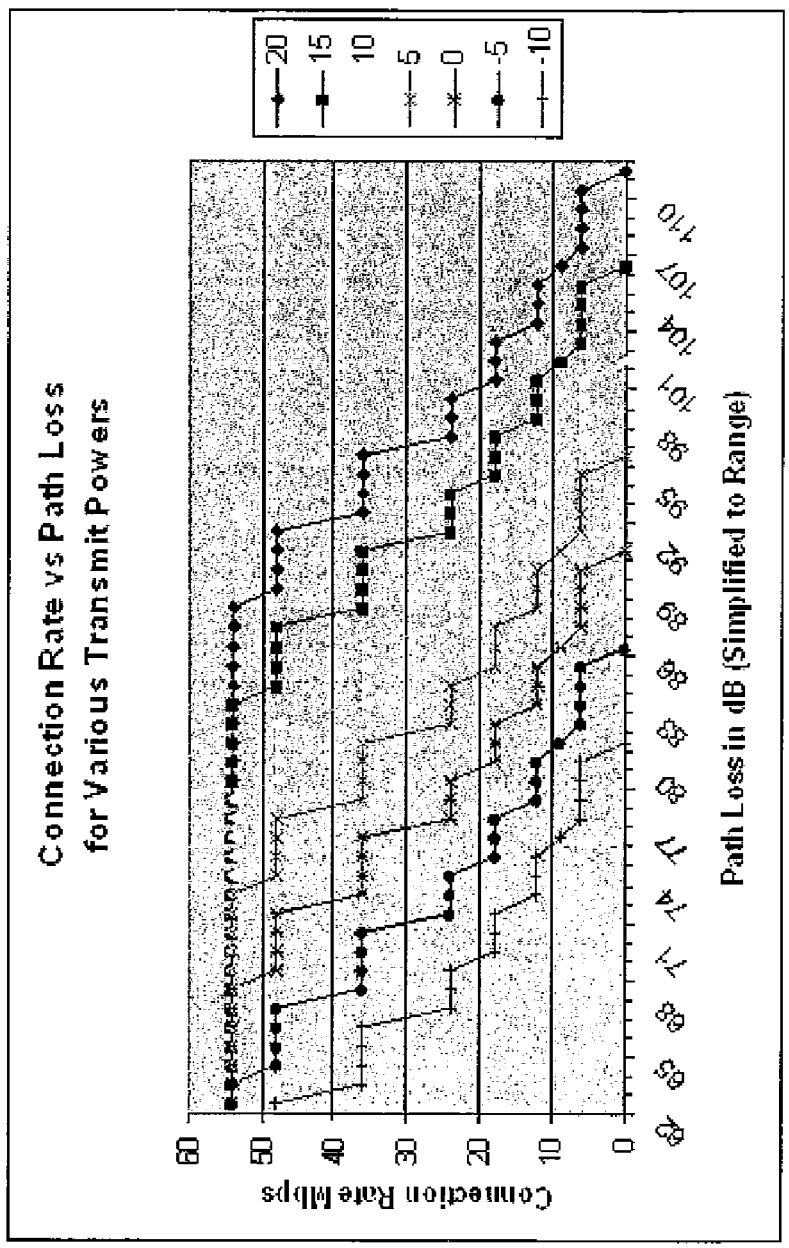
FIG. 2 shows a plot of connection rate versus path loss for various transmit powers.

Turning to FIG. 2, in FIG. 2 shows a plot of connection rate versus path loss for various transmit powers. In FIG. 2, the typical effect upon data rate and range of varying the transmit power of the example access point from 20 dBm to −5 dBm in 5 dB steps is shown. The example values may be derived from the SNR requirements of the various modulation types of Table 1 and are for illustrative purpose only without being a limitation to the scope of the invention.

FIG. 2 shows a much less desirable limiting of range by lowering transmit power. In this example, the higher more efficient data rates may be sacrificed and the lower less efficient data rates may be preserved. Generally, this is the opposite of what occurs when reducing receive threshold. However, controlling transmit power along with receiver sensitivity to limit the range of an access point reduces transmit range and associated interference with nearby access points. This reduction in interference allows higher access point density and improves channel re-use.

In an example implementation of a system for reducing transmitter power, the power at which each modulation type from Table 1 above is transmitted may be adjusted to limit transmit range while preserving the use of higher more efficient data rates. Many variations of actual power selection methods are possible and useful in example implementations. For example, an example method makes use of the differences in SNR required to successfully communicate at various modulation rates. Using Table 1 in one example, it is possible to derive suitable power levels as shown in Table 2. Table 2 may be used to specify requirements of a power reduction method which preserves the use of higher more efficient modulation rates while reducing power to limit range and to allow dense access point deployments. The transmitter may be set to the desired power level for the desired modulation rate.

TABLE 2

Difference in SNR Required to Maintain Communication for various Modulation Rates

| Modulation Rate | 54 | 48 | 36 | 24 | 18 | 12 | 9 | 6 |
|---|---|---|---|---|---|---|---|---|
| 54 | 0 | | | | | | | |
| 48 | 3 | 0 | | | | | | |
| 36 | 5 | 4 | 0 | | | | | |
| 24 | 9 | 8 | 4 | 0 | | | | |
| 18 | 12 | 11 | 7 | 3 | 0 | | | |
| 12 | 14 | 13 | 9 | 5 | 2 | 0 | | |
| 9 | 16 | 15 | 11 | 7 | 4 | 2 | 0 | |
| 6 | 19 | 16 | 12 | 8 | 5 | 3 | 1 | 0 |

An example method for reducing transmitter power may first reduce the power designated for the lowest data rate until it has been reduced by the difference in SNR between it and the second lowest data rate. The method may continue the reduction of power by reducing the power of both the second lowest and the lowest data rate until the second has been reduced by the difference in SNR between it and the third lowest data rate. The method may further continue the power reductions by reducing the power of each succeeding higher data rate until it has been reduced by the difference in SNR required for the next higher rate while simultaneously reducing power on all lesser data rates. The Results of this example process for an example access point is shown in Table 3.

TABLE 3

| Nominal Power dBm | 6 Mbps Power dBm | 9 Mbps Power dBm | 12 Mbps Power dBm | 18 Mbps Power dBm | 24 Mbps Power dBm | 36 Mbps Power dBm | 48 Mbps Power dBm | 54 Mbps Power dBm |
|---|---|---|---|---|---|---|---|---|
| 20 | 20 | 20 | 20 | 20 | 20 | 20 | 20 | 20 |
| 19 | 19 | 20 | 20 | 20 | 20 | 20 | 20 | 20 |
| 18 | 18 | 19 | 20 | 20 | 20 | 20 | 20 | 20 |
| 17 | 17 | 18 | 20 | 20 | 20 | 20 | 20 | 20 |
| 16 | 16 | 17 | 19 | 20 | 20 | 20 | 20 | 20 |
| 15 | 15 | 16 | 18 | 20 | 20 | 20 | 20 | 20 |
| 14 | 14 | 15 | 17 | 19 | 20 | 20 | 20 | 20 |
| 13 | 13 | 14 | 16 | 18 | 20 | 20 | 20 | 20 |

TABLE 3-continued

| Nominal Power dBm | 6 Mbps Power dBm | 9 Mbps Power dBm | 12 Mbps Power dBm | 18 Mbps Power dBm | 24 Mbps Power dBm | 36 Mbps Power dBm | 48 Mbps Power dBm | 54 Mbps Power dBm |
|---|---|---|---|---|---|---|---|---|
| 12 | 12 | 13 | 15 | 17 | 20 | 20 | 20 | 20 |
| 11 | 11 | 12 | 14 | 16 | 19 | 20 | 20 | 20 |
| 10 | 10 | 11 | 13 | 15 | 18 | 20 | 20 | 20 |
| 9 | 9 | 10 | 12 | 14 | 17 | 20 | 20 | 20 |
| 8 | 8 | 9 | 11 | 13 | 16 | 20 | 20 | 20 |
| 7 | 7 | 8 | 10 | 12 | 15 | 19 | 20 | 20 |
| 6 | 6 | 7 | 9 | 11 | 14 | 18 | 20 | 20 |
| 5 | 5 | 6 | 8 | 10 | 13 | 17 | 20 | 20 |
| 4 | 4 | 5 | 7 | 9 | 12 | 16 | 20 | 20 |
| 3 | 3 | 4 | 6 | 8 | 11 | 15 | 19 | 20 |
| 2 | 2 | 3 | 5 | 7 | 10 | 14 | 18 | 20 |
| 1 | 1 | 2 | 4 | 6 | 9 | 13 | 17 | 20 |
| 0 | 0 | 1 | 3 | 5 | 8 | 12 | 16 | 19 |
| −1 | −1 | 0 | 2 | 4 | 7 | 11 | 15 | 18 |
| −2 | −2 | −1 | 1 | 3 | 6 | 10 | 14 | 17 |
| −3 | −3 | −2 | 0 | 2 | 5 | 9 | 13 | 16 |
| −4 | −4 | −3 | −1 | 1 | 4 | 8 | 12 | 15 |
| −5 | −5 | −4 | −2 | 0 | 3 | 7 | 11 | 14 |
| −6 | −6 | −5 | −3 | −1 | 2 | 6 | 10 | 13 |
| −7 | −7 | −6 | −4 | −2 | 1 | 5 | 9 | 12 |
| −8 | −8 | −7 | −5 | −3 | 0 | 4 | 8 | 11 |
| −9 | −9 | −8 | −6 | −4 | −1 | 3 | 7 | 10 |
| −10 | −10 | −9 | −7 | −5 | −2 | 2 | 6 | 9 |

Figure 3:
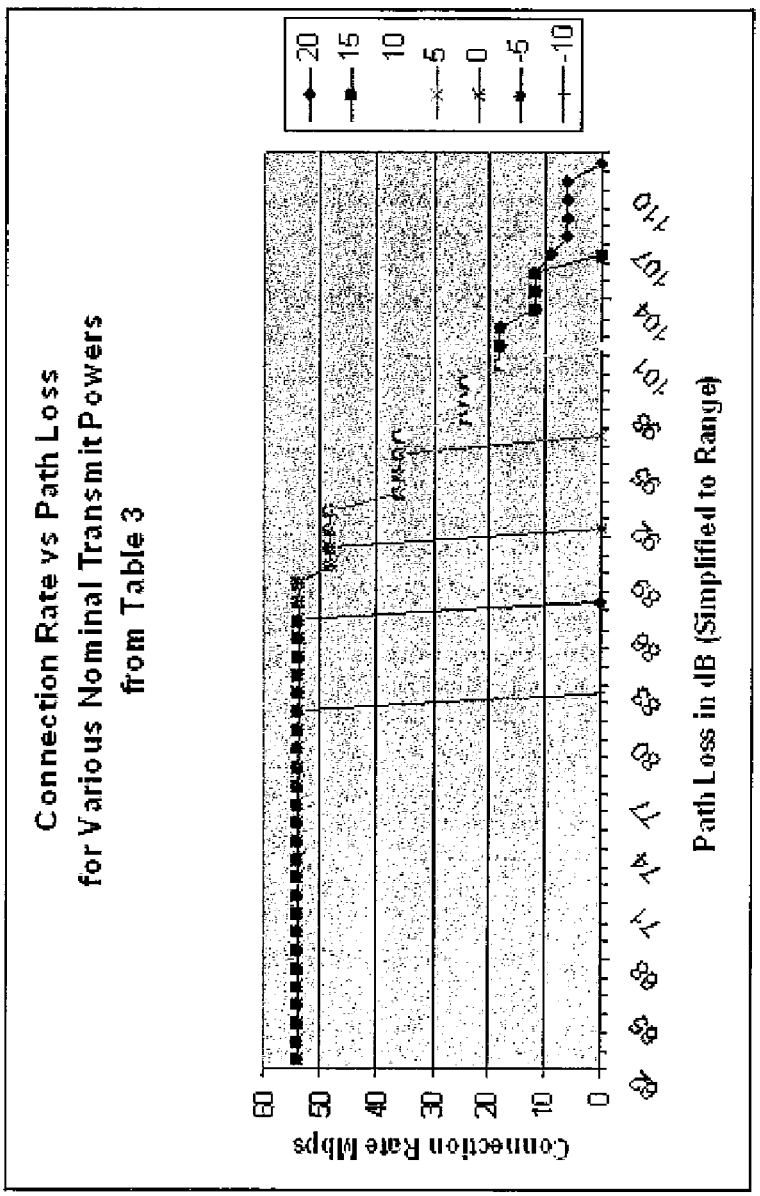
FIG. 3 shows a plot of connection rate versus path loss for various nominal transmit powers from table 3.

FIG. 3 shows a plot of connection rate versus path loss for various nominal transmit powers from table 3. FIG. 3 shows the effects of using modulation dependent transmit power control to reduce the range of an example access point. It is appreciated that by reducing the transmit powers of the lowest least efficient data rates before reducing those of higher more efficient data rates the higher more efficient data rates are preserved while limiting range to allow for dense deployments. It is also appreciated that all data rates may continue to be supported and may be used for various channel co-ordination functions.

Figure 4:
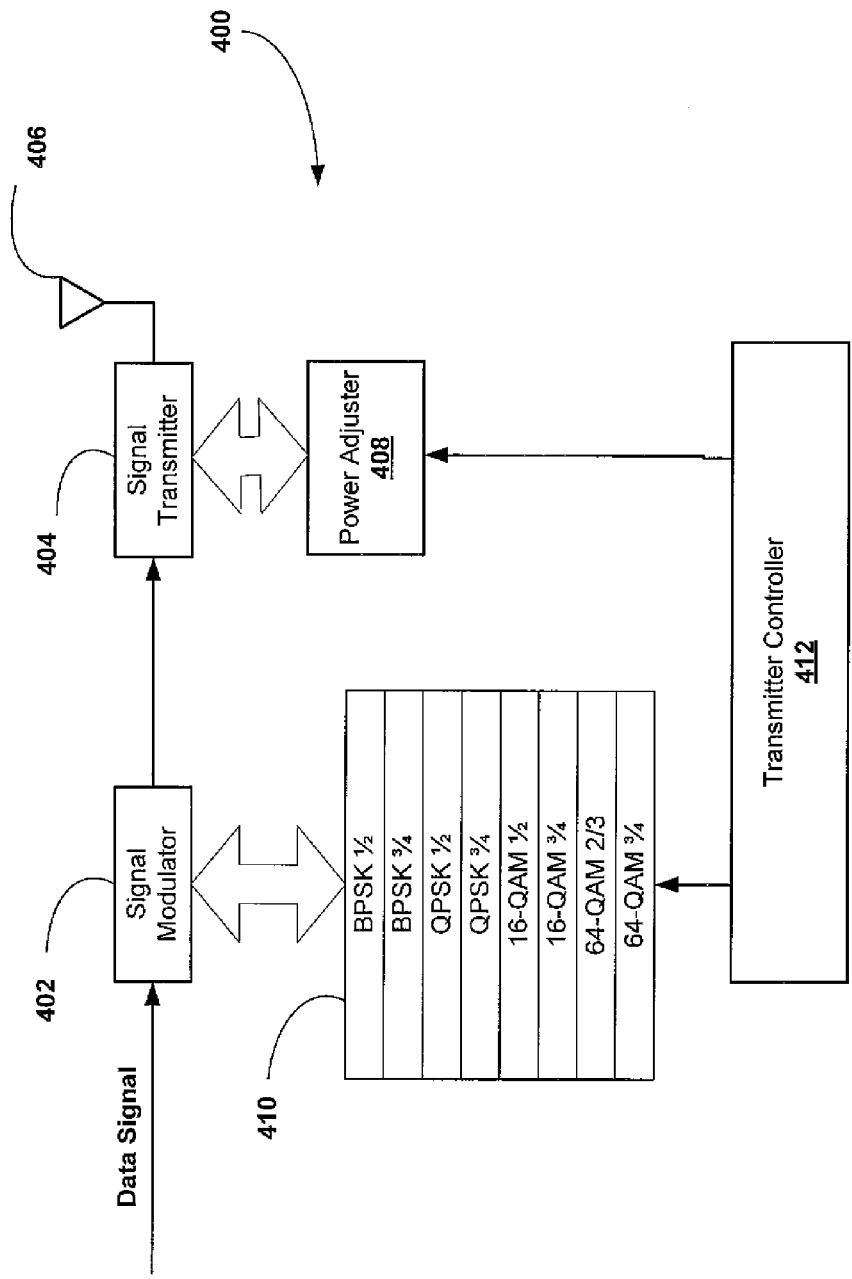
FIG. 4 is a schematic block diagram illustrating operation of an example system for controlling transmit range in a multi-modulation communication system.

FIG. 4 is a schematic block diagram illustrating operation of an example system 400 for controlling transmit range in a multi-modulation communication system. The system 400 includes a signal modulator 402, a signal transmitter 404, an antenna 406, a power adjuster 408, a multi-modulation function 410, and a transmitter controller 412. The signal modulator 402 receives a data signal having data formatted for transmission to a receiver (not shown). The signal modulator 402 modulates the data signal using a selected modulation scheme and couples a modulated signal to the signal transmitter 404 for transmission to a receiver via the antenna 406.

The signal modulator 402 may receive indication of a selected modulation scheme from the multi-modulation function 410. The multi-modulation function 410 may select a modulation scheme from a list of modulation schemes to enable communication of the data signal at a desired data rate. The data rates for each modulation scheme may be configured to communicate at the data rates listed in Table 1.

The power adjuster 408 adjusts the power level of the signal transmitter 404 as described above with reference to Table 3. The power adjuster 408 may be controlled by the transmitter controller 412. The transmitter controller 412 may implement hardware and software functions that carry out the progression of power level selections described above in deriving the data listed in Table 3.

In one example, the transmitter controller 412 may retrieve from data storage a receiver noise figure. The receiver noise figure may be obtained from some data store or determined using any suitable method for calculating a noise figure. Specific noise figures for specific receivers may be stored in a database if such knowledge is available. As described above, most present day receivers operating at normal ambient temperatures have similar noise figures.

The receiver noise figure may be used to determine a transmitter power that will achieve a desired SNR. The SNR is defined as SNR=Signal/Noise. The 'Noise' component in an example implementation may be the receiver noise figure. The 'Signal' component is a function of the transmitter power, antenna gain and path loss. The antenna gain may be a known parameter available, for example, in computer memory or from a hardware and software function configured to provide the antenna gain. The path loss may be simplified to represent the range or distance between transmitter and receiver. For purposes of determining a transmitter power, the path loss may represent the desired maximum range of the transmitter. The following equations may be used to determine a transmitted power given a selected SNR and path loss (corresponding to the maximum range):

$$\text{SNR} = (\text{Transmitter Power} + \text{Antenna Gain} + \text{Path Loss})/\text{Noise Figure} \quad \text{(Eqn. 1)}$$

$$\text{SNR} * \text{Noise Figure} = \text{Transmitter Power} + \text{Antenna Gain} + \text{Path Loss} \quad \text{(Eqn. 2)}$$

$$\text{Transmitter Power} = (\text{SNR} * \text{Noise Figure}) - (\text{Antenna Gain} + \text{Path Loss}) \quad \text{(Eqn. 3)}$$

Eqn. 3 above provides a relationship that may be implemented as a computer program, for example, to determine the transmitter power that will limit the transmitter range as desired. The selected SNR may be selected based on the desired data rate.

The transmitter power may be determined during a configuration of a particular installation of a wireless transmitter and receiver, such as a wireless access point. During such a configuration, a desired limited range may be determined according to the environment of the access point and the locations of neighboring access points. The transmitter controller 412 may include functions for generating a table of data similar to Table 3. As the transmitter system switches to different modulation methods during operation, the table similar to Table 3 may be used to generate a new power level for the selected modulation method.

FIG. 5 is a flowchart illustrating operation of an example method 500 for controlling transmit range in a multi-modulation communication system. Examples of the method 500 may be implemented using an example system such as the system 400 in FIG. 4. At step 502 of the method 500, a transmitter power reduction method is initiated. Initialization may include retrieving parameters and/or querying a user for input such as a desired transmitter range limit. For example, constants such as the antenna gain and receiver noise figure may be determined or retrieved, and the path loss may be defined according to a desired transmitter range. In an example transmitter power reduction method, minimum transmitter power levels sufficient to communicate signals to a receiver at a predetermined maximum range are determined for a selected group of modulation methods. In the described example, a table similar to Table 3 may be created and stored for use during operation of the multi-modulation communication system.

At step 504, a current modulation method is identified. The first modulation used is the modulation method specified to operate at the lowest data rate. At step 506, a current modulation method transmitter power is set to the maximum power (MAX_power) level at which the transmitter may be specified to operate. At step 508, the current transmitter power is reduced by one increment of the power level. In Table 3, the current transmitter power is reduced by 1 dBm each time the power level is reduced. At step 508, the power level for each of the lower data rate modulation methods is also reduced by the increment. At step 510, the SNR is calculated for the current modulation method at the current transmitter power. At step 514, the SNR difference between the minimum SNR of the current modulation method and the minimum SNR of the next lowest modulation method is determined. In one example, the SNR difference may be obtained from a table such as Table 2.

Decision block 516 determines a difference between the current modulation method transmitter power and the next lowest data rate modulation method transmitter power and compared with the SNR difference calculated in step 514. If the difference between transmitter power levels is the same as the SNR difference calculated at step 514, the transmitter power at the current modulation method is set to the current transmitter power at step 518. If the difference between transmitter power levels is not the same as the SNR difference calculated at step 514, the method proceeds to step 508 where the transmitter power level is reduced for a next test.

At decision block 520, the method determines if a transmitter power level has been determined for each modulation method. If the current modulation method is the modulation method having the highest data rate, the process is complete and the results are stored in a table that may be similar to Table 3. If the current modulation method is not the modulation method having the highest data rate, the modulation method with the next lowest data rate is designated to be the current modulation method at step 522. The method then proceeds to step 506 where the current transmitter power level is set to MAX power.

When the method in FIG. 5 has completed, the transmitter controller 412 (in FIG. 4) may store a table from which a transmitter power level may be retrieved for a given modulation method to limit the transmitter range to a desired range. During operation, the transmitter power level may be modified by the power adjuster 408 (for example) as the system switches from one modulation method to another.

While the present invention has been described with reference to certain embodiments, it will be understood by those skilled in the art that various changes can be made and equivalents can be substituted without departing from the scope of the present invention. For example, a transmitter controller is described above with reference to FIG. 4. The transmitter controller may be implemented using hardware and/or software functions. The functions implementing a transmitter controller may be distributed among different functions and components. It will be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed:

1. A method for reducing multi-modulation radio transmit range, the method comprising:
    determining a data modulation type at which a transmitter is operating; and
    adjusting a transmitter power according to the data modulation type to limit transmit range, where the transmitter power is dependent on the data modulation type based on a data connection rate in such a way as to improve channel use efficiency and where data connection rates that are lower than the maximum possible data rate operate at lower transmit power to facilitate various channel co-ordination functions at lower data rates.

2. The method of claim 1 further comprising:
    for each data modulation type supported, determining a transmitter power at which the transmitter range is limited to a predetermined distance.

3. The method of claim 2 where the step of determining the transmitter power further comprises:
    determining each data modulation type and arranging in order of a data connection rate corresponding to each data modulation type;
    for each data modulation type, determining a difference between a minimum signal-to-noise ratio (SNR) at the connection rate of one connection rate and a minimum SNR at the next higher connection rate; and
    starting with the lowest data connection rate and at the maximum transmit power, calculating transmitter power levels for each data connection rate that would limit the transmitter range and permit operation at the highest data connection rate.

4. A method comprising:
    reducing a transmit power for lower data rate, less efficient modulation types in proportion to their data transmission efficiency and required SNR;
    delaying the reduction of transmit power for higher data rate more efficient modulation types until all lower data rates have been reduced in transmit power by the difference in SNR required to support communication at each data rate.

5. The method of claim 4, wherein data rates are supported to facilitate various channel co-ordination functions.

6. A communication system operable to communicate using multiple data modulation types comprising:
    a signal modulator to receive a data signal for transmission and to modulate the data signal for transmission according to one of the multiple data modulation types;
    a signal transmitter to receive a modulated data signal from the signal modulator to transmit the signal over a communications medium at a transmitter power level; and a transmitter controller to determine a data modulation type and to adjust the transmitter power level to limit transmitter range, where the transmitter controller determines each transmitter power level by reducing a transmit power for lower data rate, less efficient modulation types in proportion to their data transmission efficiency and required SNR; and delaying the reduction of transmit power for higher data rate more efficient modulation types until all lower data rates have been reduced in transmit power by the difference in SNR required to support communication at each data rate.

7. The system of claim 6 where the transmitter controller includes a transmitter power level designated for each data modulation type to limit the transmitter range by a predetermined amount.

8. The system of claim 7 where the transmitter controller includes a configuration function to determine each transmitter power level for each data modulation type so that the transmitter range is limited by the predetermined amount.

* * * * *